United States Patent [19]

Baker

[11] 3,882,081

[45] May 6, 1975

[54] PROCESS FOR STABILIZING VINYLIDENE CHLORIDE POLYMERS AGAINST METAL-INDUCED DEGRADATION

[75] Inventor: Alvin W. Baker, Walnut Creek, Calif.

[73] Assignee: The Dow Chemical Company, Midland, Mich.

[22] Filed: Oct. 3, 1973

[21] Appl. No.: 403,148

Related U.S. Application Data

[63] Continuation of Ser. No. 262,693, June 14, 1972, abandoned.

[52] U.S. Cl. .................. 260/45.75 V; 260/45.7 R
[51] Int. Cl. ........................ C08f 45/56; C08f 45/58
[58] Field of Search .. 260/45.75 R, 45.7 R, 45.75 V

[56] References Cited
UNITED STATES PATENTS

| | | | |
|---|---|---|---|
| 2,907,742 | 10/1959 | Wrey et al. | 260/45.7 R |
| 3,078,283 | 2/1963 | Hay | 260/45.7 R |
| 3,300,442 | 1/1967 | Darby et al. | 260/45.75 R |

*Primary Examiner*—M. J. Welsh
*Attorney, Agent, or Firm*—Ronald G. Brookens

[57] ABSTRACT

Compositions of matter comprising a haloethylene polymer which tends to decompose when heated, particularly in the presence of iron, and as stabilizing additives therefore a mixture containing (1) from about 0.2 to about 2 percent by polymer weight of dibasic lead phosphite and (2) from about 0.2 to about 2 percent by polymer weight of 1,4-benzoquinone.

3 Claims, No Drawings

PROCESS FOR STABILIZING INYLIDENE CHLORIDE POLYMERS AGAINST METAL-INDUCED DEGRADATION

This is a continuation of application Ser. No. 262,693 filed June 14, 1972 (now abandoned).

BACKGROUND

Haloethylene polymers, and the polymers of vinylidene chloride in particular, are known to cross-link and gel when subjected to elevated temperatures and particularly when in the presence of even trace amounts of certain metal salts, particularly iron salts. These iron salt impurities may be present as a result of contact of the polymer with polymerization or processing equipment, for example when such haloethylene polymer is used as a polymeric binder in the preparation of magnetic tape, or may be acquired from water used as the polymerization medium or are present as impurities in various modifiers added to the polymer. Such impurities are not easily removed from the polymer by usual washing methods.

An effective stabilizer for haloethylene polymer, particularly when such polymer is subjected to the presence of iron salts, must satisfy the following requirements: (1) react with evolved hydrochloric acid to prevent attack on iron or other metal equipment, (2) react with any iron (or other metal) and dissolve or precipitate such metal as an insoluble compound, and (3) react as a chain stopper or scavenger for polymer free radicals.

Dibasic lead phosphite has been known to be a stabilizing agent which is capable of reacting with hydrochloric acid and being capable of precipitating iron. Such material is ineffective, however, as a chain stopper or scavenger for polymer free radicals.

It is also known that polymerization of many vinyl monomers, initiated by free radicals, can be effectively retarded by small amounts of benzoquinone type materials acting as a free radical scavenger.

Applicant has discovered, which discovery represents the present invention, that the utilization of specified amounts of dibasic lead phosphite in conjunction with specified amounts of certain p-benzoquinones provide synergistic stabilizer systems providing truly unique stabilizing effectiveness for haloethylene polymers which are subjected to elevated temperatures and iron impurities.

SUMMARY

The present invention is directed to compositions of matter comprising a haloethylene polymer which tends to decompose when heated, particularly in the presence of iron, and as stabilizing additives therefore a mixture of (1) from about 0.2 to about 2 percent by polymer weight of dibasic lead phosphite and (2) from about 0.2 to about 2 percent by polymer weight of 1,4-benzoquinone.

The haloethylene polymers contemplated by the present invention include the various polymers and interpolymers of vinylidene and vinyl halides including, especially, the normally crystalline polymers of vinylidene chloride.

Typical of such normally crystalline vinylidene chloride polymers are those containing from about 70 to 95 percent by weight of vinylidene chloride with the remainder being composed of one or more monoethylenically unsaturated comonomers exemplary of which are the esters and amides of acrylic acid, methacrylic acid and maleic acid or other copolymerizable vinyl acids. Specific esters are those which contain alcohols of 1-8 carbon atoms, such as methyl acrylate, methyl methacrylate, ethyl acrylate, n-butyl methacrylate, octyl acrylate, 2-ethylhexyl acrylate, etc. Specific amides include acrylamide, methacrylamide, t-butylacrylamide and primary alkyl acrylamides such as n,n-dimethylacrylamide and the like. Other monomers which may be copolymerized with vinylidene chloride include acrylonitrile, methacrylonitrile and acrylates or methacrylates of glycols, e.g., hydroxyethyl, hydroxypropyl or hydroxybutyl acrylate or methacrylate. The preferred compositions comprise copolymers of from about 80–90 percent by weight vinylidene chloride and 20–10 percent by weight acrylonitrile, and interpolymers of vinylidene chloride containing from about 5 to 10 percent methyl acrylate, about 15 percent 2-hydroxy ethyl acrylate and up to about 1 percent of itaconic acid with the remainder being vinylidene chloride.

The stabilizing additives prescribed herein may be added to or admixed with the haloethylene polymers in any conventional way, e.g., during the preparation of magnetic tape formulations the stabilizing additives may be used directly in a ball mill apparatus during grinding of the magnetic tape formulation.

As indicated supra, the preferred concentration range of each component of the stabilizing additives is from about 0.2 to about 2 percent based on the weight of the haloethylene polymer. Below about 0.2 percent, the stabilizing activity of the additive falls off rapidly and amounts greater than about 2 percent provide no additional advantage.

The ratio of the individual stabilizing additives one to the other are not critical within the defined concentration range, however, optimum synergistic results are generally obtained using approximately equal amounts on a weight percent basis.

The following nonlimiting example, wherein all parts and percentages are by weight, is illustrative of the present invention:

EXAMPLE

In each of a series of experiments, varying amounts and types of stabilizing additives were added to a solution comprising 10 grams of a copolymer of 79 percent vinylidene chloride and 21 percent acrylonitrile dissolved in 100 ml. of methyl ethyl ketone having additionally added thereto 10 grams of 40 mesh iron powder. Immediately following addition of such stabilizing additives, the samples were placed in an oven heated to a temperature of 61°C. The time required for initial gelation of each sample was then noted and recorded. The following Table I sets forth the amounts and types of additives used and the gelation times:

TABLE I

| Sample No. | Stabilizing Additive Type | Amt. (%) | Time to Initial Gel (Days) |
|---|---|---|---|
| 1 | None | | 1/6 |
| Series 1 | | | |
| 2 | A | 1.0 | 3 |
| 3 | B | 0.2 | 3 |
| 4 | A | 0.8 | |
| (the invention) | plus | | >37 |
| | B | 0.2 | |

TABLE I-Continued

| Sample No. | Stabilizing Additive Type | | Amt. (%) | Time to Initial Gel (Days) |
|---|---|---|---|---|
| Series II | | | | |
| 5 | A | | 1 | 3 |
| 6 | B | | 1 | 35 |
| 7 | C | | 1 | 9 |
| 8 (the invention) | A<br>plus<br>B | | 0.5<br>0.5 | >90 |
| 9 (for comparison) | A<br>plus<br>C | | 0.5<br>0.5 | 26 |
| Series III | | | | |
| 10 | A | | 2 | 4 |
| 11 | B | | 2 | 45 |
| 12 (the invention) | A<br>plus<br>B | | 1<br>1 | >132 |

A - dibasic lead phosphite
B - 1,4-benzoquinone
C - 2-methoxy-1,4-benzoquinone

The above data illustrate the remarkable synergistic effects provided by use of the mixture of stabilizing additives of the present invention.

What is claimed is:

1. In the process of stabilizing vinylidene chloride polymer against metal-induced degradation, the improvement consisting of admixing with said vinylidene chloride polymer (1) from about 0.2 to about 2 percent by polymer weight of dibasic lead phosphite and (2) from about 0.2 to about 2 percent by polymer weight of 1,4-benzoquinone.

2. The process of claim 1 wherein said vinylidene chloride polymer is a normally crystalline vinylidene chloride polymer.

3. The process of claim 2 wherein said normally crystalline vinylidene chloride polymer is a copolymer of vinylidene chloride and acrylonitrile.

* * * * *